United States Patent [19] [11] 4,356,398
Komaki et al. [45] Oct. 26, 1982

[54] METHOD OF PROCESSING RADIOGRAPHIC IMAGE

[75] Inventors: Takao Komaki; Seiji Matsumoto; Masamitsu Ishida, all of Minami-ashigara, Japan

[73] Assignee: Fuji Photo Film Co., Ltd., Kanagawa, Japan

[21] Appl. No.: 168,800

[22] Filed: Jul. 11, 1980

[30] Foreign Application Priority Data

Jul. 11, 1979 [JP] Japan .................................. 54/87809
Jul. 11, 1979 [JP] Japan .................................. 54/87810

[51] Int. Cl.[3] .......................... G03C 5/16; G01T 1/11; H04N 1/40

[52] U.S. Cl. .................................. 250/327.2; 250/337; 250/486.1; 364/414; 364/515; 378/98

[58] Field of Search ............ 250/484, 337, 486, 327.1; 364/414, 515

[56] References Cited

U.S. PATENT DOCUMENTS 1,609,703 12/1926 Eggert et al. ........................ 250/323
3,975,637 8/1976 Ikedo et al. .......................... 250/337

OTHER PUBLICATIONS

"Improving Low-Illumination Video", NASA Tech. Briefs, Spring 1979, p. 18.

*Primary Examiner*—Alfred E. Smith
*Assistant Examiner*—Carolyn E. Fields
*Attorney, Agent, or Firm*—Gerald J. Ferguson, Jr.; Joseph J. Baker; C. Lamont Whitham

[57] ABSTRACT

In a radiographic image recording system in which a stimulable phosphor plate is exposed to X-rays to record a radiographic latent image therein, the stimulable phosphor plate is exposed to stimulating rays thereafter to emit light according to the stored energy of X-rays, and the emitted light is detected by a photodetector and converted to an image signal to be used for finally recording a visible image on a photosensitive film or the like, a plurality of stimulable phosphor plates are used for recording radiographic images of an object viewed from the same direction. The image signals read out from the plurality of stimulable phosphor plates are superposed to obtain an averaged image signal. The averaged image signal is then subjected to a gradation process for enhancing the contrast of the image.

14 Claims, 8 Drawing Figures

METHOD OF PROCESSING RADIOGRAPHIC IMAGE

BACKGROUND OF THE INVENTION

1. Field of the Invention

This invention relates to a method of processing an image obtained by a radiographic image recording system using a stimulable phosphor, and more particularly to a method of improving the signal-to-noise ratio (hereinafter referred to simply as S/N ratio) of the image obtained by a radiographic image recording system in which a stimulable phosphor is first exposed to imagewise radiation passing through an object like a human body to record a latent radiation image therein and the stimulable phosphor is then exposed to stimulating rays to emit light representing the recorded radiation image, the light is detected and the detected signal is used for finally recording a visible image on another recording material.

2. Description of the Prior Art

Radiographic images are used for the purpose of diagnosis, inspection of internal structure of various materials and so forth. When using the radiographic system, it is required to detect the very minute difference in X-ray absorption of an object. The ability of detecting the minute difference in X-ray absorption is represented by contrast detecting power of the radiographic image recording system. The higher is the contrast detecting power, the higher is the diagnostic efficiency and accuracy or the inspection efficiency and accordingly the higher is the value of the image in the practical sense. Therefore, in order to enhance the diagnostic efficiency and accuracy or the inspection efficiency (hereinafter represented solely by diagnostic efficiency and accuracy), it is desired that the contrast detecting power of the radiographic image be improved. In the practical use, however, it is difficult to simply improve the contrast detecting power by enhancing the contrast of the radiographic image because of the noise of various kinds involved therein.

In the radiographic image recording system using a stimulable phosphor as mentioned above, there are existing noises as follows in the process of recording a latent image and reading out the recorded image:

(1) quantum noise of the X-ray radiation, (2) structure noise caused by uneven distribution of the applied coating layer of the phosphor or of the particles of the phosphor in the phosphor sheet, (3) noise involved in the stimulating rays used for stimulating the phosphor to cause the phosphor to emit light based on the radiation image stored therein, (4) electrical noise involved in the electric system used for detecting the emitted light from the stimulable phosphor and converting the detected light to an electric signal, and (5) noise involved in the light emitted from the phosphor upon stimulation thereof.

SUMMARY OF THE INVENTION

The object of the present invention is to provide a method of processing the radiographic image obtained by a radiographic image recording system using a stimulable phosphor in which the noise involved in the radiographic image is effectively reduced and the contrast detecting power of the image is greatly improved.

The above object of the present invention is accomplished by recording radiographic images of an object viewed from the same direction on a plurality of stimulable phosphor sheets, and superposing the plurality of image signals obtained by reading out the radiographic images recorded in the stimulable phosphor sheets, and further enhancing the contrast of the image obtained by superposing the plurality of image signals.

The enhancement of the contrast is conducted by a gradation processing which enhances the contrast of whole the image or only of the particular frequency components of the image.

In accordance with the present invention, the above noises can be reduced by superposing the image signals of the plurality of stimulable phosphor sheets. This is because the above mentioned five kinds of noises (1) to (5) are independent in different phosphor sheets and accordingly are suppressed by superposing the image signals of the different phosphor sheets. By superposing the image signals, the noises are suppressed whereas signal components of the image are positively added. The noises are averaged to substantially reduce the noises. Therefore, by enhancing the contrast of the thus obtained image, an image of high detecting power can be achieved. Thus, in accordance with the present invention the diagnostic efficiency and accuracy can be markedly improved in the radiation image recording system using a stimulable phosphor.

DETAILED DESCRIPTION OF THE INVENTION

Now the present invention will be described in detail with reference to the accompanying drawings as briefly described above. Preferred embodiments will be described in detail hereinafter referring to FIGS. 1 to 6. Before the description of the preferred embodiments, the present invention will be described in further detail with respect to the degree of enhancement of contrast with reference to FIGS. 7 and 8.

The degree of enhancement of contrast can be controlled by selecting the number of phosphor sheets used for recording an image or the number of image signals to be superposed. When the number of superposed sheets is small, the contrast cannot be made too high because of the noise which will appear as the contrast increases. When the number of superposed sheets is large, the contrast may be made high in order to enjoy the effect of superposition. Therefore, there are upper and lower limits in the degree of enhancement of contrast according to the number of superposed phosphor sheets. In order to obtain desirable contrast, it is desirable to determine the resulting contrast quantatively by use of a contrast parameter, C.P. The contrast parameter C.P. represents the degree of contrast emphasis and is defined as the ratio of the difference in optical density of the final image ($\Delta D$) to the difference in logarithm of the emitted amount of light ($\Delta \log E$), C.P.$=\Delta D/\Delta(\log E)$. The contrast parameter C.P. should be selected in connection with the number of the phosphor sheets superposed.

Figure 7:
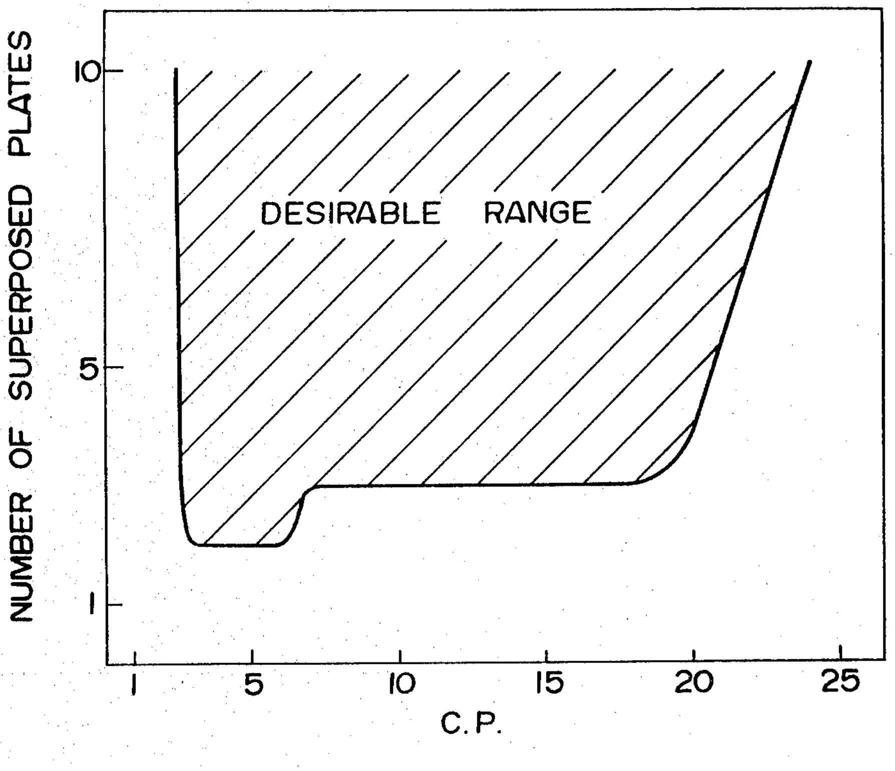
FIG. 7 is a graph showing a desirable range of contrast emphasis represented by a contrast parameter, C.P., in the method of the present invention.
Figure 8:
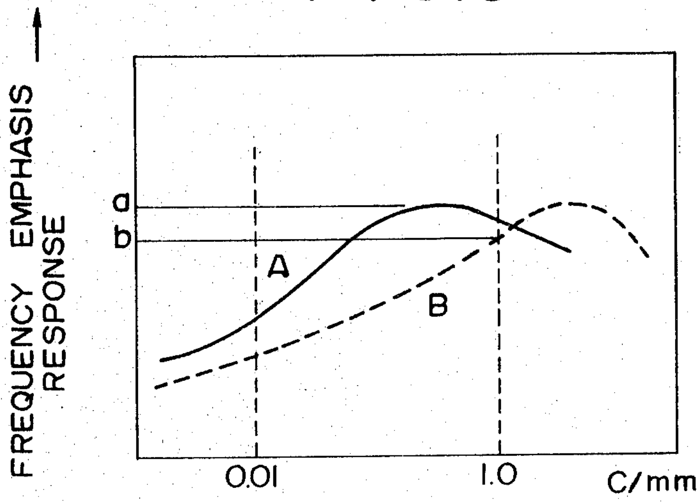
FIG. 8 is a graph showing the response of frequency emphasis used in determining the desirable contrast parameter, C.P. in the present invention.

The present inventors have found that the desirable results can be obtained when the contrast parameter C.P. is within the range indicated by hatching in FIG. 7 as a result of repeated tests for the final images having optical density in the range of 0.5 to 1.5.

From FIG. 7, it is known that the desirable value of C.P. is 3 to 24 when the superposed number of the phosphor sheets is 10, 3 to 20 when the number is 4 and 5, 3 to 18 when 3, and 3 to 6 when 2.

It has been confirmed by tests that the desirable range of the contrast parameter C.P. may be selected at the maximum value of the response within the range of the frequency of 0.01 to 1.0 c/mm even in the case that the contrast is emphasized only for a particular frequency component. Namely, in FIG. 8, the contrast parameter C.P. may be determined as the peak value when the response of the frequency emphasis has a peak (see a) in the range of spatial frequency of 0.01 to 1.0 c/mm as shown by the curve-A, and as the maximum value (see b) of the response value within the range of 0.01 to 1.0 c/mm when the response does not have a peak in that range as shown by the curve-B.

In case of emphasizing the contrast of whole the image, the contrast parameter may be determined on basis of a large area density change since the contrast is emphasized substantially uniformly for the D.C. component to A.C. component of about 1 c/mm in spatial frequency. In case of emphasizing the contrast for a particular frequency component or range, however, the contrast parameter C.P. is determined as the product of a degree of contrast emphasis ($\gamma_{DC}$) for a D.C. component (substantially a component of less than 0.01 c/mm in spatial frequency) of the image and a degree of frequency emphasis M determined by a below-mentioned frequency emphasis coefficient $\beta$. This product $\gamma_{DC}\cdot M$ corresponds to $\Delta D/\Delta(\log E)$ at the emphasized frequency.

The above two types of contrast emphasis are respectively effective for particular uses. The former whole image contrast emphasis is effective for relatively large images or images having a vague contour such as the images of cancer, abscess and liver. The latter particular frequency contrast emphasis is particular effective for relatively small images or images having a clear contour such as blood vessel, calcification image and diseased bone.

The desirable range of the degree of frequency emphasis from the viewpoint of diagnosis seems to be a little broader than that of the degree of whole contrast emphasis. However, the difference is not significantly large and it can be concluded that the desirable range is as shown in FIG. 7 in both cases.

Further, in recording the radiographic image on a plurality of stimulable phosphor plates, it is possible to use a slit recording method employing a slit. According to tests conducted by the present inventors, it was confirmed that the slit recording method was suitable for the present invention and the contrast detecting power was further improved thereby. This is considered to be based on the fact that scattering rays are eliminated by the slit and the sharpness of the image is enhanced thereby.

Further, in this invention, it is possible to record the radiation image on a plurality of stimulable phosphor plates at once by exposing a stack of the phosphor plates to the radiation passing all through the stacked phosphor plates. In this case, a plurality of stimulable phosphor plates are stacked and retained in a cassette and exposed at once to X-rays passing through an object. In this method, however, due to the large thickness of the stack of the phosphor plates the distance of the phosphor plates from the object is considerably different for every plate. Accordingly, there is likely a problem that the size of the recorded images on the different phosphor plates are different from each other due to the different distance from the object and the diverging X-rays from a point source. The difference in size of the recorded images results in disengagement of the corresponding recorded images when superposed through the image processing system, which results in lowering in the sharpness of the processed image. Particularly in case of recording a tomographic image, the angle at which the X-rays impinge upon the phosphor plates is large and the disengagement of the images becomes prominent and the finally obtained image will be blurred to a great extent.

In such a case, it is desirable to used self-supporting phosphor plates in place of the ordinary double layer type plates in which a phosphor layer is applied on a substrate. By stacking the self-supporting type phosphor plates composed of a layer of a binder having self-supporting property containing dispersed therein stimulable phosphor particles, the total thickness of the stack of phosphor plates can be made small and the possibility of image disengagement or image blur can be eliminated.

As the stimulable phosphor which is desired to emit light having a wavelength within the range of 300 to 500 nm. For example, rare earth activated alkaline earth metal fluorohalide phosphor is preferred. One example of this phosphor is, as shown in Japanese unexamined Patent Publication No. 55(1980)-12143 (Abandoned U.S. Ser. No. 169,954, filed July 18, 1980), a phosphor represented by the formula $(Ba_{1-x-y},Mg_x,Ca_y)FX:aEu^{2+}$ wherein X is at least one of Cl and Br, x and y are numbers satisfying $0<x+y\leqq 0.6$ and $xy\neq 0$, and a is a number satisfying $10^{-6}\leqq a\leqq 5\times 10^{-2}$. Another example of this phosphor is, as shown in Japanese unexamined Patent Publication No. 55(1980)-12145 (U.S. Pat. No. 4,239,968), a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0\leqq x\leqq 0.6$, and y is a number satisfying $0\leqq y\leqq 0.2$. Further, as the stimulable phosphor to be used in this invention can be used ZnS:Cu,Pb; $BaO.xAl_2O_3$:Eu wherein $0.8\leqq x\leqq 10$; and $M^{II}O.xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5\leqq x\leqq 2.5$, as shown in Japanese unexamined Patent Publication No. 55(1980)-12142 (U.S. Pat. No. 4,236,078). Furthermore, as the stimulable phosphor can be used LnOX:xA wherein Ln is at least one of La, Y, Gd and Lu, X is at least one of Cl and Br, A is at least one of Ce and Tb, x is a number satisfying $0<x<0.1$, as shown in Japanese unexamined Patent Publication No. 55(1980)-12144 (U.S. Pat. No. 4,236,078). Among the above numerated phosphors, the rare earth activated alkaline earth metal fluorohalide phosphor is the most preferable, among which barium fluorohalides are the most preferable in view of the high intensity of emission of light.

Further, it is desirable to color the phosphor layer of the stimulable phosphor plate made of the above phosphor by use of pigments or dyes to improve the sharpness of the image obtained thereby as disclosed in Japanese Patent Application No. 54(1979)-71604 (U.S. Ser. No. 156,520 filed June 5, 1980).

As the stimulating rays for stimulating the stimulable phosphor to cause the phosphor to emit light is used a laser beam having high directivity. As the light source for the laser beam is preferred a laser source capable of emitting light having a wavelength within the range of 500 to 800 nm, preferably 600 to 700 nm. For example, a He-Ne laser (633 nm) and a Kr laser (647 nm) can be used. Other light sources can be used if combined with a filter which cuts out the light of the wavelength of less than 500 nm and more than 800 nm.

The thickness of the self-supporting phosphor plate which is preferred for use in a simultaneous recording system in which a stack of the phosphor plates is exposed to a radiation at once is preferred to be within the range of about 100 to about 400μ in view of the total thickness and the intensity of the light emitted therefrom. The mixing ratio of the binder to the phosphor is preferably selected within the range of 1:5 to 1:10 (binder:phosphor) though it is not limited thereto. As the binder can be used any type of resin which does not absorb the light emitted from the stimulable phosphor upon stimulation when dried and provides a self-supporting film when hardened. For instance, polyvinyl resins (e.g. polyvinyl alcohol, polyvinyl acetal, polyvinyl acetate), polyurethane resins, polyester resins, polyether resins, vinylchloride-vinylacetate copolymer resins, cellulose resins (e.g. triacetyl cellulose, nitrocellulose) and so forth can be used as the binder.

The self-supporting phosphor plate can be made by a well known method of forming a film by use of the above described materials. For instance, a mixture of said binder and the stimulable phosphor mixed by use of a proper volatile solvent is casted on a flat plate having small adhesion to the binder and the casted layer is peeled off the plate, which is known as flow casting.

Further, the self-supporting phosphor plate may be provided on the back surface thereof a protective layer of polyethylene terephthalate having a thickness of 5 to 20μ in order to reinforce the mechanical strength thereof. The protective layer may be provided with color like gray in order to prevent diffusion of visible light and prevent blur of image.

Figure 1:
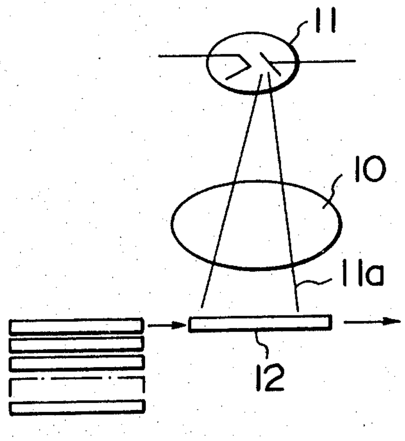
FIGS. 1, 2 and 3 are side views showing various examples of the method of recording a radiographic image on a stimulable phosphor sheets constituting a step of the method of this invention.
Figure 2:
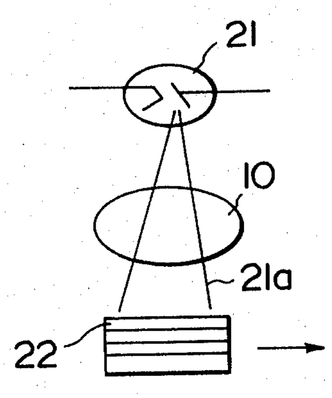
Figure 3:
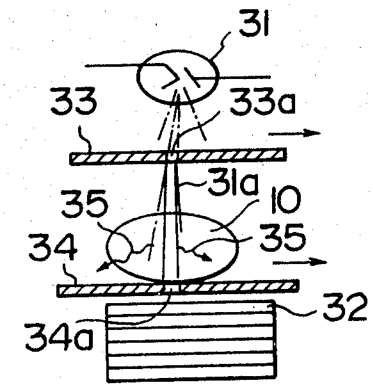

Now the present invention will be described in detail with reference to a preferred embodiment thereof referring to FIGS. 1 to 5. FIGS. 1 to 3 show various kinds of method of recording images of an object on a plurality of stimulable phosphor plates at once or sequentially. FIG. 1 shows a sequential type and FIGS. 2 and 3 show simultaneous types of recording radiation images on a plurality of phosphor plates. The method as shown in FIG. 3 is a slit recording method. Referring to FIG. 1, a stimulable phosphor plate 12 is successively brought to an exposure station to be exposed to X-rays 11*a* from an X-ray source 11 through an object 10. The object 10 is fixed while several phosphor plates 12 are exposed to the X-rays 11*a* through the object 10 so that the same images are recorded on several phosphor plates 12. Referring to FIG. 2, a stack of stimulable phosphor plates 22 are exposed at once to X-rays 21*a* from an X-ray source 21 through an object 10 so that the same images are recorded on several phosphor plates 12 simultaneously. In this simultaneous recording method, there is no need to fix the object 10 and accordingly not only it is easy to make several records of the same object but also the same images can be obtained without movement of the object therebetween when superposed in image processing. Further, since the object is exposed to X-rays only once, the dose of the radiation to which the object 10 is exposed can be minimized.

In the example as shown in FIG. 3, a stack of several phosphor plates 32 is exposed together to X-rays 31*a* from an X-ray source 31 through two slits 33*a* and 34*a* of two slit plates 33 and 34 which do not transmit X-rays. The two slit plates 33 and 34 extend in parallel to each other and are provided with slits 33*a* and 34*a* respectively which are parallel to each other, and moved in synchronization with each other so that the X-rays 31*a* from the X-ray source 31 will always impinge upon the stack of stimulable phosphor plates 32 and scan the stack from one end to the other. In this method using slits, sharp radiographic images can be obtained because the scattering rays 35 scattered by the object 10 do not reach the stack of phosphor plates 32.

When the several phosphor plates are stacked as shown in FIGS. 2 and 3, it is desirable that the lower phosphor plates remote from the X-rays source 21, 31 have higher sensitivity so that all the phosphor plates 22, 23 will be recorded with the same level. For instance, when four phosphor plates are stacked, the relative sensitivity of the phosphor plates is made 1.5, 2, 3 and 4 from the upper plate to the lower to record the images with the same level in all the plates. Alternatively, the recording is made on the phosphor plates of the same sensitivity and the read out gain is changed for the different phosphor plates so that the lower phosphor plate be read out with a high gain and the upper phosphor plate be read out with a low gain so that image signals of substantially the same level can be obtained for all the phosphor plates.

Figure 4:
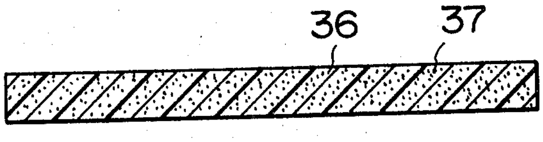
FIG. 4 is an enlarged sectional view showing an example of a self-support type stimulable phosphor sheet employed in the present invention.

In the simultaneous recording method as shown in FIGS. 2 and 3, it is desirable that self-supporting phosphor plates as shown in FIG. 4 be employed. The self-supporting stimulable phosphor plate is composed of a sheet of binder 36 having self-supporting rigidity and stimulable phosphor particles 37 dispersed therein. Since the self-supporting phosphor plate is far thinner than the conventional phosphor plate composed of a substrate and a phosphor layer applied thereon, the sharpness of the image can be markedly improved in the finally obtained image.

Figure 5:
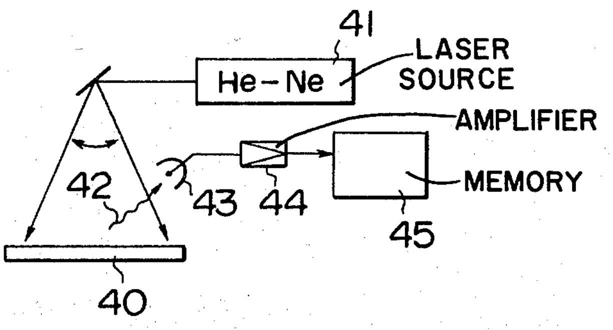
FIG. 5 is a side view showing an example of the method of reading out a radiographic image recorded in the stimulable phosphor sheet constituting another step of the method of this invention.

When the recorded image is read out an image information read out system as shown in FIG. 5 is used for instance. Referring to FIG. 5, a stimulable phosphor plate 40 which has been exposed to X-rays and carries a latent radiographic image in the form of stored energy is scanned with a laser beam from a He-Ne laser source 41. As the stimulable phosphor plate 40 is scanned with the laser beam, it emits light 42 according to the stored radiation energy. The emitted light is detected by a photodetector 43 like a photomultiplier and recorded or memorized in a memory 45 like a magnetic tape recording means via an amplifier 44. Thus, the image information recorded in every phosphor plate 40 is read out and recorded in the memory 45. The image signals of all the phosphor plates 40 of one object are superposed or added together to obtain an image signal for one image of the object.

The image signals recorded in the several phosphor plates 40 are all added together to obtain a single summed up signal of one image. The summed up signal or the averaged signal obtained from the summed up signal represents the image has a higher signal-to-noise ratio than the original images obtained on the respective phosphor plate because the noises of the superposed images are cancelled with each other and only the substantial signals are summed up. Therefore, the image signal thus obtained provides a higher the signal-to-noise ratio. In accordance with the present invention, the superposed image signal is further subjected to gradation processing to enhance the contrast of the image. Since the signal-to-noise ratio is improved, the enhancement of the contrast of the image provides an image of markedly high diagnostic efficiency and accuracy which is very desirable from the viewpoint of practical use.

Figure 6:
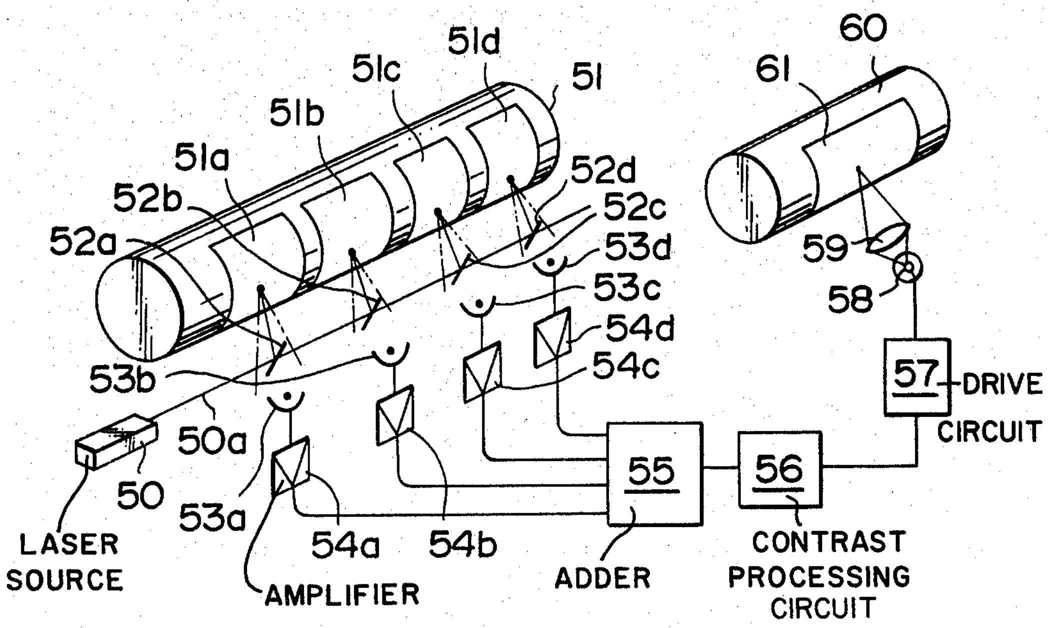
FIG. 6 is a schematic perspective view showing another example of the method of reading out a radiographic image recorded in the stimulable phosphor sheet.

FIG. 6 shows another example of the image read out step in which the plurality of latent radiographic images recorded on the plurality of phosphor plates are read out at once. Referring to FIG. 6, a plurality of stimulable phosphor sheets 51*a*, 51*b*, . . . 51*d* are mounted on a single drum 51 and the read out signals read out therefrom by use of a plurality of photomultipliers 53*a*, . . . 53*d* are electrically summed up. This type of parallel read out system is desirable from the viewpoint of efficiency to save time. A He-Ne laser source 50 emits a laser beam 50*a* which is reflected toward the phosphor sheets 51*a*, . . . 51*d* on the drum 51 by a plurality of beam splitters like semi-transparent mirrors 52*a*, 52*b* . . . 52*d* and simultaneously scans the phosphor sheets 51*a*, . . . 51*d*. The light emitted from the stimulable phosphor sheets 51*a*, . . . 51*d* is detected by the plurality of photomultipliers 53*a*, . . . 53*d* and the outputs thereof are amplified through the amplifiers 54*a*, . . . 54*d*. The outputs of the amplifiers 54*a*, . . . 54*d* are input into an adder 55 and then sent to a contrast enhancing circuit 56 where the contrast is emphasized. The output of the contrast processing circuit 56 is supplied to a drive circuit 57 for driving a light modulating tube (glow tube) 58 which is used for recording an image on a photosensitive film 61 on a drum 60 via a focusing lens 59. Thus, a final visible image is recorded on the film 61. The finally obtained image on the film 61 has a high signal-to-noise ratio and a high contrast. Hence the radiographic image processing system in accordance with the present invention provides a high contrast detecting power.

It should be noted that in the above described embodiment shown in FIG. 6 the intensity of the laser beam 50*a* is lowered as it transmits through the several beam splitters 52*a*, . . . 52*d*. In this case, therefore, it is desirable that the sensitivity of the stimulable phosphor sheets is made different and the phosphor sheets of higher sensitivity be located remote from the laser source 50 on the drum 51 and those of lower sensitivity be located closer to the laser source 50 in order to obtain the output of substantially the same level from all the phosphor sheets 51*a*, . . . 51*d*.

In the present invention, it is possible to conduct a frequency emphasis processing on the superposed image signal in place of the contrast emphasis processing in which contrast of whole the image is emphasized. In other words, it is possible to emphasize the contrast of the image in a particular spatial frequency range. One of the examples of the frequency emphasis processing will hereinbelow be described in detail.

As the frequency emphasis processing are known various methods like a convolution method or Fourier conversion method. These methods are, however, impractical because of their very complicated calculation required. In place of these methods it is desirable to employ an unsharp mask processing in which the gradation is increased only in the high frequency range above a super-low frequency range. The unsharp mask processing is described in detail in a copending U.S. patent application Ser. No. 104,855, now U.S. Pat. No. 4,315,318. In this method, an unsharp mask processing represented by a formula of $$S = Sorg + \beta(Sorg - Sus)$$

is conducted, where a product of an emphasis coefficient $\beta$ and a difference between an original signal Sorg and an unsharp mask signal Sus corresponding to the super-low frequency is added to the original signal Sorg.

The unsharp mask signal Sus referred to in this invention means a signal representing every scanning point which is made by blurring the original image signal to contain only the frequency component lower than the super-low frequency. In other words, the unsharp mask signal Sus is a signal representing an unsharp image obtained by blurring the original image to such an extent that the unsharp mask signal contains only the super-low frequency. In the unsharp mask corresponding to the unsharp image, the modulation transfer function is not less than 0.5 at the spatial frequency of 0.01 cycle/mm and not more than 0.5 at the spatial frequency of 0.5 cycle/mm.

The maximum value of the modulation transfer function of the image in which the frequency emphasis is conducted according to the above formula is desired to be made 1.5 to 10 times as large as the value of the modulation transfer function near the zero frequency.

In this invention, the emphasis coefficient $\beta$ may be fixed or changed as a function of the original image signal (Sorg) or the unsharp mask signal (Sus). By changing the emphasis coefficient as a function of the original image signal (Sorg) or the unsharp mask signal (Sus), the diagnostic efficiency and accuracy are further improved.

Further, since there are much noise in the high frequency region, it is desirable to conduct a smoothing processing on the signal S in which the modulation transfer function is made 0.5 or less in the frequency range of 0.5 to 5 c/mm. With this smoothing processing, the noise components are averaged and accordingly the image quality is improved.

The unsharp mask can be obtained by the following methods for example.

(1) The original image signal at every scanning point is memorized and the memorized original image signals are read out together with the surrounding signals according to the size of the unsharp mask to obtain a mean value as the unsharp mask signal Sus. (The mean value is obtained as an simple arithmetical mean or various kinds of weighted mean.) In this method, the unsharp mask is made in the form of analog signals or in the form of digital signals after A/D conversion. Further, it is also possible to make the unsharp mask by transmitting the analog signal through a low pass filter in the primary scanning direction and processing the signal in the digital form in the sub-scanning direction.

(2) after the original image signal is read out by use of a light beam or the like having a small diameter, the unsharp mask signal is read out by use of a light beam having a larger diameter. This is possible in case that the stimulable phosphor is still stimulable after the first stimulation.

(3) The expansion of the diameter of the stimulating light beam which occurs while the beam passes through the stimulable phosphor layer by scattering is utilized. When the stimulating light beam scans the stimulable phosphor, the original image signal Sorg is obtained on the incident side of the phosphor layer and the unsharp mask signal Sus is obtained on the opposite side of the phosphor layer. In this case, the size of the unsharp mask can be controlled by changing the extent of light scattering effect by the phosphor layer or changing the size of the aperture used for receiving the scattering light.

The unsharp mask should be selected so that the modulation transfer function becomes 0.5 or less within the super-low frequency range of 0.5 to 0.01 c/mm.

Further, in processing the signal according to said formula the emphasis coefficient $\beta$ must be specified. These values are externally selected for every object or preselected for several parts of human body or kinds of the radiograph and memorized in a memory in advance so as to be simply selected therefrom when the processing is conducted.

For the result of the operation or processing as above, the smoothing processing is conducted to reduce the high frequency component. With this smoothing processing, the noise can be reduced without damaging the information necessary for diagnosis.

The emphasis coefficient $\beta$ is desired to be made small for the low density range of the final image and large for the high density range to prevent the formation of an artifact-image which is liable to appear with frequency emphasis.

As one example thereof, when the X-ray image of a stomach (Magen) obtained using a barium sulfate contrast medium is subjected to said frequency emphasis (enhancement of particular spatial frequency components) or the unsharp masking process with the emphasis coefficient $\beta$ fixed, the boundary of the low brightness area having a uniform low brightness over a wide range corresponding to the portion containing the barium sulfate contrast medium is overemphasized and an artifact-image having a double contour will appear. If the emphasis coefficient $\beta$ is changed so that it is made small in the low brightness region for the portion filled with the contrast medium and is made large in the high brightness region for the stomach details or the like, the occurrence of the artifact-image having the double contour can be prevented. Further, in case of the front chest image, if $\beta$ is fixed the noise increases in the low brightness region like the back bone and the heart and in an extreme case the fine portions become only saturated white (the fog level of the recording medium), which disturbs badly the visual observation and markedly lowers the diagnostic efficiency and accuracy. To the contrary, if $\beta$ is made small in the low brightness regions like the backbone or the heart and made large in the high brightness region like the lung, the above mentioned noise and the saturated white areas can be reduced.

In any example of the above types, if the emphasis coefficient $\beta$ is fixed at a small value for the frequency emphasis, the diagnostic efficiency and accuracy are not enhanced since the contrast of the important portions like the stomach details, the blood vessels of the lung and veins is not enhanced although various artifact-images may be prevented. Thus, by changing the emphasis coefficient $\beta$ continuously according to the brightness of the image on the stimulable phosphor, it is possible to obtain a radiation image having high diagnostic efficiency and accuracy controlling the occurrence of the artifact-image.

As one method of changing the emphasis coefficient $\beta$, $\beta$ is changed almost linearly between the maximum brightness $S_1$ and the minimum brightness $S_0$ which are obtained from a histogram of the image on the stimulable phosphor. The maximum and minimum values $S_1$ and $S_0$ are determined according to the sort of the X-ray image to be processed. For instance, the maximum and minimum brightness may be determined as the brightness where the integrated histogram becomes 90 to 100% and 0 to 10%, respectively. Further, according to the inventors' tests, it has been found that the results are almost the same between the emphasis coefficient $\beta$ changed with the original image signal and the changed with the unsharp mask signal.

The degree of emphasis by the frequency processing is determined by the emphasis coefficient $\beta$. It has been found that the product of a value M defined by a formula of $$M=1.2\times\beta+1.0$$

and the degree of contrast emphasis $\gamma_{DC}$ substantially corresponds to the contrast parameter C.P. The desirable contrast parameter C.P. is represented by the range as shown in FIG. 7, which is a little broader than that for the emphasis of the contrast of whole the image, but is substantially the same.

When the emphasis coefficient is desirable to be changed according to the signal strength, the desirable range of C.P. should be selected as follows.

The C.P. of the image portion which is important for diagnosis should be within the desirable range as shown in FIG. 7. That is, when the low brightness portion of the image is particularly important for diagnosis, the C.P. which is applied for low bright portion should be selected within the range as shown in FIG. 7. When the high brightness portion of the image is particularly imporant for diagnosis, the C.P. should be selected similarly. When all portion is important, the average value of the C.P. should be selected within the range as shown in FIG. 7.

In addition to the above mentioned frequency emphasis, it is possible to provide a gradation processing for changing the gradation of the image. The super-low frequency processing as described above does not have a high effect for images in which the density gently changes over a wide range as of the lung cancer or the mammary cancer. In these images, the diagnostic efficiency and accuracy are improved when the whole gradation is enhanced or the contrast is emphasized together with the whole gradation enhancement. The gradation processing may be conducted either before or after the super-low frequency process or the unsharp masking process. If the gradation processing is conducted before the unsharp masking process, an A/D conversion is conducted after the signal has been gradation processed with a non-linear analog circuit. If it is conducted after the A/D conversion, a digital process is possible by use of a mini-computer. When the gradation processing is conducted after the unsharp masking processing, the gradation processing can be conducted in the digital form or may be conducted in the analog form after D/A conversion.

Now the present invention will be described with reference to the examples thereof.

EXAMPLE 1

As the stimulable phosphor was used powder of BaFBr:Eu phosphor. 8 weight parts of the phosphor and one weight part of nitrocellulose were mixed together by use of a solvent (mixed solution of acetone, ethyl acetate and butyl acetate) to prepare a coating solution having a viscosity of about 50 centistokes. Then, the solution was applied on a horizontally placed polyethylene terephthalate film (substrate) uniformly and allowed to stand for one day and night to be naturally dried. Thus, a phosphor layer having a thickness of about 200μ was formed on the substrate and a stimulable phosphor sheet was obtained.

Five sheets of thus prepared phosphor sheets were superposed and put into a cassette and exposed to X-rays of 80 KVp through an object.

The phosphor sheets thus exposed to the X-rays were scanned and stimulated by a laser beam of a He-Ne laser and the emitted light therefrom was detected and the obtained image signal was recorded in a magnetic tape. The signal thus obtained for the five phosphor sheets were superposed and the average signal was obtained. Then, the image signal was used to reproduce an image with a C.P. of 3 to 20 into the optical density range of 0.5 to 1.5. Hence, an image of very high diagnostic efficiency and accuracy were obtained.

Further, the image was subjected to a contrast emphasis by an unsharp masking processing with the degree of contrast emphasis for D.C. component set at about 2.0 and the frequency emphasis degree M set at 1.5 to 10. Hence, an image of high diagnostic efficiency and accuracy as compared with the conventional radiograph was obtained. Particularly, the blood vessel and bones were made into images of high diagnostic efficiency and accuracy. The frequency most emphasized in these images was 0.2 to 0.5 c/mm. The C.P. at the frequency was 3 to 20.

When the C.P. was 2 or less, there was not seen any advantage of superposing a plurality of images and the result was not better than that obtained with only one image. When five phosphor sheets were scanned with the He-Ne laser beam, the sensitivity of the photomultipliers for detecting the light emitted from the stimulated phosphor sheets was controlled so that the relative sensitivities of the photomultipliers were made 1, 1.5, 2, 3 and 4 in the order of arrangement from the side closer to the X-ray source. The level of the obtained image signals was almost the same for all the phosphor sheets.

Further, when SrS:Eu phosphor or ZnS:Ag phosphor was used in place of the BaFBr:Eu phosphor employed in the above example, the image signal obtained had a very low level and large noise and could not provide a good image on the final recording material.

EXAMPLE 2

As the stimulable phosphor was used $(Ba_{0.9},Mg_{0.1})FBr:Eu$ phosphor. A plurality of stimulable phosphor sheets were made in the similar manner to Example 1. Three sheets were stacked together and put into a cassette and exposed to X-rays of 80 KVp at once.

Similarly to Example 1, the image signals obtained from the phosphor sheets were superposed and an image was reproduced with the C.P. of 3 to 14. As a result, an image of high diagnostic efficiency and accuracy was obtained. With the C.P. of 2 or less, the result was unfavorable. With the C.P. of 15 or more, the image was unclear with prominent granularity.

EXAMPLE 3

As the stimulable phosphor was used BaFBr:Ce,Tb phosphor. With all the conditions made the same as those in Example 1, the same results as those of Example 1 were obtained.

EXAMPLE 4

As the stimulable phosphor was used $(Ba_{0.7},Ca_{0.3})FBr:Eu$ phosphor. With all the conditions made the same as those in Examples 1 and 2, the same results as those of Examples 1 and 2 were obtained.

EXAMPLE 5

Since it was proved that the sensitivity of the stimulable phosphor sheet is in proportion to the thickness thereof if the thickness of the phosphor layer is about 600μ or less, stimulable phosphor sheets of different thickness were used instead of changing the sensitivity of the photomultipliers.

The phosphor as used in Example 1 was used and the coating solution was made in the same manner as in Example 1. Six phosphor sheets having a phosphor layer of the thickness of 100μ, 150μ, 200μ, 300μ, 400μ and 600μ were prepared and stacked together in such an order that the thicker one is located remote from the object and were put into a cassette and exposed to X-rays of 80 KVp passing through the object. The phosphor sheet was scanned with a He-Ne laser beam and an image signal was obtained. By averaging the signal and reproducing an image with a C.P. of 3 to 20, images of very high diagnostic efficiency and accuracy were obtained.

EXAMPLE 6

As the stimulable phosphor was used BaFBr:Ce,Tb phosphor. Four stimulable phosphor sheets having a thickness of 200μ, 260μ, 340μ and 450μ were prepared and stacked together and put into a cassette. Then the stack of phosphor sheets was exposed to X-rays of 120 KVp. With the same process as of Example 5 with a C.P. of 3 to 18, images of very high diagnostic efficiency and accuracy were obtained.

EXAMPLE 7

A number of stimulable phosphor sheets having a thickness of 200μ were prepared in the same manner as in Example 1. Six phosphor sheets thus prepared were exposed one by one successively to X-rays of 80 KVp passing through an object to obtain radiographic images of the same object on the six phosphor sheets. The image signals obtained from these sheets were superposed with a C.P. of 3 to 20 and an image was obtained.

The image thus obtained had very high diagnostic efficiency and accuracy.

EXAMPLE 8

As the stimulable phosphor was used BaFBr:Eu phosphor. Five phosphor sheets were prepared in the same manner as in Example 1. The five phosphor sheets were stacked together and put into a cassette and exposed to X-rays of 80 KVp by use of a slit exposure device as shown in FIG. 3.

With the image processing similar to that employed in Example 1 with a C.P. of 3 to 20, an image of higher quality and diagnostic efficiency and accuracy than that obtained in Example 1 was obtained.

EXAMPLE 9

As the stimulable phosphor was used BaFBr:Eu phosphor. The coating solution prepared in the same manner as in Example 1 was uniformly applied on a horizontally placed polytetrafluoroethylene sheet and allowed to stand for one day and night to be naturally dried into a phosphor layer having a tickness of 150μ. Then, the phosphor layer was peeled off from the polytetrafluoroethylene sheet. Thus, a self-supporting stimulable phosphor sheet was obtained. Five sheets of the self-supporting phosphor sheet were stacked and put into a cassette. Then, the stack was exposed to X-rays of 80 KVp.

With the image processing similar to that employed in Example 1 with a C.P. of 14, an image of high resolving power of contrast and high sharpness and accordingly high diagnostic efficiency and accuracy was obtained.

The response measured by use of a resolving power testing chart was proved to be improved by about 20 to 25% at the spatial frequency of 2 c/mm as compared with that of the phosphor sheets having a substrate on which the phosphor layer was applied.

Further, by conducting a contrast emphasis processing by an unsharp masking processing with the degree of contrast emphasis for D.C. component $\gamma_{DC}$ of 2.0 and the degree of frequency emphasis of 6, a very high quality image having much higher diagnostic efficiency and accuracy as compared with the conventional radiograph was obtained. Particularly the blood vessel and bones were made into images of high diagnostic efficiency and accuracy. The frequency most emphasized in these images was 0.2 to 0.5 c/mm. The C.P. at the frequency was 12.

EXAMPLE 10

By use of BaFBr:Eu phosphor dispersed in a binder of polyvinyl acetate, self-supporting phosphor sheets were made by the same manner as in Example 1. Three sheets having a thickness of 100μ, 150μ and 200μ were prepared and stacked in the order in which a thinner sheet is located closer to the X-ray source. Thus, tomographic images of an object were recorded.

The three phosphor sheets were scanned with a laser beam and the image signals read out from the light emitted therefrom were recorded on a magnetic tape. Though the distance of the three phosphor sheets was different for the different sheets and the sensitivities of the photodetectors used for reading out the image information from the three phosphor sheets were all the same, the levels of the image signals obtained from the three phosphor sheets were almost the same owing to the different thickness and sensitivity of the phosphor sheets. The image signals were superposed and processed with a C.P. of 12. As a result, even an object of very minute contrast was made into an image of high sharpness and high contrast resolving power. The response measured by use of a testing chart was proved to be improved by about 20% at the spatial frequency of 1 c/mm as compared with the phosphor sheets having substrate.

EXAMPLE 11

Five stimulable phosphor sheets made in Example 9 were put into a cassette and exposed to X-rays of 80 KVp by use of a slit exposure device as shown in FIG. 3.

The five phosphor sheets thus exposed to X-rays were scanned with a He-Ne laser beam and the obtained image signals were recorded on a magnetic tape. These signals were averaged and processed with a C.P. of 10. The resulting image had high sharpness and high contrast resolving power as compared with the image obtained in Example 1. Thus, the image had very high diagnostic efficiency and accuracy.

EXAMPLE 12

As the stimulable phosphor was used BaFBr:Ce,Tb phosphor powder. 7 weight parts of the phosphor and one weight part of nitrocellulose were mixed together by use of a solvent (mixed solution of acetone, ethyl acetate and butyl acetate) to prepare a coating solution having a viscosity of 50 centistokes. Then, the coating solution was applied on a glass mirror face coated with a layer of polytetrafluoroethylene horizontally oriented, and allowed to stand for one day and night to be naturally dried into a phosphor layer having a thickness of about 120μ. Then, the phosphor layer was peeled off from the glass mirror face. Thus, a self-supporting phosphor sheet was prepared.

Six sheets thus prepared were stacked together and put into a cassette to be exposed to X-rays of 90 KVp passing through a chest of a human body as an object.

The image signals obtained from the six phosphor sheets were superposed similarly to Example 9 and averaged and further subjected to unsharp masking processing to emphasize the frequency range of 0.05 to 1 c/mm. Then, the image was processed with a C.P. of 8 into a final reproduction image. As a result, the artery in the spine portion and the blood vessel in the heart portion were clearly observed which were not able to be seen in the conventional radiograph. At the same time, the lung was also clearly observed as compared with the conventional radiograph. Thus, an image having clear information of both the blood vessels around the spine and heart and the lung providing high diagnostic efficiency and accuracy was obtained.

EXAMPLE 13

A tomographic image of the abdomen was recorded by use of the same self-supporting phosphor sheets as those of Example 9. The potential of the X-ray tube was 110 KVp. Similarly to Example 9, five sheets were used and the image signals obtained therefrom were superposed and processed with $\gamma_{DC}$ of 1.5 and M of 8 for image emphasis.

As a result, the contour of the kidney was clearly observed and the condition and shape of the kidney were clearly recognized thereby. Further, the tissue of the interior of the kidney was recognized. Accordingly, the diagnostic efficiency and accuracy was extremely higher than the conventional radiograph in which the contour of the kidney was very unclear due to the influence of granularity and the density difference of the tissue in the interior of kidney was very small.

EXAMPLE 14

By use of six self-supporting phosphor sheets made in the same manner as in Example 9, the detectable limit of minute contrast was measured using test examples of minute contrast object as follows.

Between a pair of polymethyl methacrylate plates having a thickness of 12 cm and 8 cm respectively, a circular Nylon sheet (diameter 10 mm, thickness 0.5 mm and 0.3 mm) or a circular polyethylene terephthalate sheet (diameter 10 mm, thickness 0.18 mm, 0.10 mm, 0.08 mm and 0.06 mm) was sandwiched. The above object was exposed to X-rays in the same manner as in Example 9. The results were compared between the following conditions.

(A) A single radiograph taken by the conventional radiography using a radiographic film, (B) A single image obtained on a self-supporting stimulable phosphor sheet, (C) An image obtained by superposing 6 images on six self-supporting stimulable phosphor sheets and averaging the image and emphasizing the contrast by a C.P. of 2, and (D) An image obtained by superposing 6 images on six self-supporting stimulable phosphor sheets and averaging the image and emphasizing the contrast by a C.P. of 11 in accordance with the present invention.

The image forming was conducted according to Example 9. The results were as shown in Table 1 below in which the signs −, 0, + and ++ means the degree of clarity of the pattern observed as follows.

++: The pattern is clearly observed.

+: The pattern is observed.

0: The pattern seems to be observed.

−: The pattern cannot be observed.

TABLE 1

| | | Nylon | | Polyethylene terephthalate | | | |
|---|---|---|---|---|---|---|---|
| | | 0.5mm | 0.3mm | 0.18mm | 0.10mm | 0.08mm | 0.06mm |
| (A) | Conventional Method | 0 | − | − | − | − | − |
| (B) | Stimulable Phosphor Self-supporting Type 1-sheet | 0 | − | − | − | − | − |
| (C) | Stimulable Phosphor Self-supporting Type 6-sheets Average C.P.2 | + | 0 | − | − | − | − |
| (D) | Stimulable Phosphor Self-supporting Type 6-sheets Average C.P.11 | ++ | ++ | ++ | + | 0 | − |

From the results as shown in Table 1, the following conclusions can be provided.

(1) In the conventional method (A), the pattern only seems to be observed with the Nylon sheet of 0.5 mm. With a thinner sheet, the image or contrast was not observed at all. This was the same in the method (B), too.

(2) In the method (C) wherein the image signals were averaged and the contrast was emphasized with a C.P. of 2, the Nylon sheet of 0.5 mm was only "observed" and that of 0.3 mm was only "seemed to be observed" and anything thinner could not be observed.

(3) In the method (D) of the present invention, even 0.1 mm thick sheet of polyethylene terephthalate was observed. Thus, the contrast resolving power was markedly improved.

EXAMPLE 15

A polyethylene terephthalate layer of about 15μ thick was applied on both surfaces of the self-supporting phosphor sheet made in Example 9 as protective layers.

Then, the tests similar to those conducted in Example 14 were conducted. The results were similar to those of Example 14. Further, since the sheets were covered with the protective layers, the sheets were well protected from scratches and dusts when handling.

We claim:

1. A method of processing a radiographic image in a radiographic image recording system in which a stimulable phosphor plate is exposed to X-rays passing through an object to record a radiographic latent image of the object in the form of energy of X-rays stored therein, the stimulable phosphor plate is then exposed to stimulating rays to emit light according to the energy of X-rays stored therein, the emitted light is detected by a photodetecting means and converted to an image signal and the image signal is used for recording a visible image on another recording material, said processing method comprising recording images of the same object from the same direction on a plurality of said stimulable phosphor plates, superposing the image signals obtained from the plurality of stimulable phosphor plates to obtain an image signal having averaged image information, and enhancing the contrast of said image signal thus obtained by a gradation processing.

2. A method of processing a radiographic image as defined in claim 1 wherein said plurality of stimulable phosphor plates are simultaneously exposed to the X-rays to record the images of the same object at once.

3. A method of processing a radiographic image as defined in claim 2 wherein said plurality of stimulable phosphor plates are stacked together and exposed to the X-rays at once.

4. A method of processing a radiographic image as defined in claim 1 wherein said stimulable phosphor plate is a self-supporting stimulable phosphor plate.

5. A method of processing a radiographic image as defined in claim 4 wherein the thickness of said self-supporting stimulable phosphor plate is within the range of 100 to 400μ.

6. A method of processing a radiographic image as defined in claim 1 wherein the number of said plurality of stimulable phosphor plates is 3, and the degree of contrast enhancement of the image signal represented by the ratio (ΔD/ΔlogE) of the optical density difference (ΔD) to the emitted light amount difference in logarithm ($\Delta\log E$) of the finally obtained image is within the range of 3 to 18 in the range of optical density of 0.5 to 1.5.

7. A method of processing a radiographic image as defined in claim 1 wherein the number of said plurality of stimulable phosphor plates if 4 or more, and the degree of contrast enhancement of the image signal represented by the ratio ($\Delta D/\Delta\log E$) of the optical density difference ($\Delta D$) to the emitted light amount difference in logarithm ($\Delta\log E$) of the finally obtained image is within the range of 3 to 20 in the range of optical density of 0.5 to 1.5.

8. A method of processing a radiographic image as defined in claim 1 wherein said plurality of stimulable phosphor plates are exposed to X-rays by a slit exposure method.

9. A method of processing a radiographic image as defined in claim 1 wherein said contrast enhancement is conducted for the whole image contrast.

10. A method of processing a radiographic image as defined in claim 1 wherein said contrast enhancement is conducted for only a particular frequency component.

11. A method of processing a radiographic image as defined in claim 10 wherein said particular frequency component is above a super-low frequency of the radiographic image or of the image obtained by the superposition of said image signals.

12. A method of processing a radiographic image as defined in claim 11 wherein said contrast enhancement of the particular frequency component is performed by an unsharp masking processing in which an unsharp mask signal Sus corresponding to said super-low frequency is obtained and an operation represented by a formula $Sorg + \beta(Sorg - Sus)$, where Sorg is an original image signal and $\beta$ is an emphasis coefficient, is conducted for every point of the image.

13. A method of processing a radiographic image as defined in claim 12 wherein said unsharp mask has a modulation transfer function of 0.5 or less in the super-low spatial frequency range of 0.5 to 0.01 cycle/mm.

14. A method of processing a radiographic image as defined in claim 12 wherein said emphasis coefficient $\beta$ is changed according to the original image signal Sorg.

* * * * *